(12) United States Patent
Borinato

(10) Patent No.: US 10,555,456 B2
(45) Date of Patent: Feb. 11, 2020

(54) AUTO MOWING SYSTEM

(71) Applicant: Positec Power Tools (Suzhou) Co., Ltd, Suzhou (CN)

(72) Inventor: Gianni Borinato, Vicenza (IT)

(73) Assignee: Positec Power Tools (Suzhou) Co., Ltd., Suzhou (CN)

( * ) Notice: Subject to any disclaimer, the term of this patent is extended or adjusted under 35 U.S.C. 154(b) by 158 days.

(21) Appl. No.: 15/799,114

(22) Filed: Oct. 31, 2017

(65) Prior Publication Data

US 2018/0064025 A1    Mar. 8, 2018

Related U.S. Application Data

(63) Continuation of application No. 14/758,424, filed as application No. PCT/CN2013/090746 on Dec. 27, 2013, now Pat. No. 9,820,433.

(30) Foreign Application Priority Data

Dec. 28, 2012 (CN) .......................... 2012 1 0584509
Dec. 28, 2012 (CN) .......................... 2012 1 0585225

(51) Int. Cl.
*A01D 34/00* (2006.01)
*A01B 69/04* (2006.01)
*G05D 1/00* (2006.01)
*A01D 101/00* (2006.01)

(52) U.S. Cl.
CPC .......... *A01D 34/008* (2013.01); *A01B 69/008* (2013.01); *G05D 1/0088* (2013.01); *A01D 2101/00* (2013.01); *B60L 2200/22* (2013.01); *B60L 2260/32* (2013.01); *Y02T 10/7005* (2013.01); *Y02T 10/7072* (2013.01);
(Continued)

(58) Field of Classification Search
CPC .................................................... A01D 34/008
See application file for complete search history.

(56) References Cited

U.S. PATENT DOCUMENTS

| 5,187,663 A | 2/1993 | Kamimura et al. |
| 5,682,313 A | 10/1997 | Edlund et al. |
| 5,942,869 A | 8/1999 | Katou et al. |

(Continued)

FOREIGN PATENT DOCUMENTS

| CH | 700014 B1 | 6/2010 |
| CN | 2395679 Y | 9/2000 |

(Continued)

OTHER PUBLICATIONS

Chinese Office Action for Application No. 2012105852259 dated May 22, 2015, 14 pages.

(Continued)

*Primary Examiner* — Calvin Cheung
(74) *Attorney, Agent, or Firm* — TraskBritt

(57) ABSTRACT

A robotic mowing system that includes a station and a robotic mower. The robotic mower has a controller and a memorizer, the memorizer stores a working procedure, and after receiving a start command input by a user, the controller executes the working procedure, so as to control the robotic mower to automatically and repeatedly mow and return to the station to be charged until the controller receives a stop command. In this way, the user does not need to input working parameters, and costs are relatively low.

20 Claims, 9 Drawing Sheets

(52) U.S. Cl.
CPC ............ *Y02T 90/121* (2013.01); *Y02T 90/128* (2013.01); *Y02T 90/14* (2013.01); *Y02T 90/163* (2013.01)

(56) References Cited

U.S. PATENT DOCUMENTS

| | | | |
|---|---|---|---|
| 6,076,025 | A | 6/2000 | Ueno et al. |
| 6,493,613 | B2 | 12/2002 | Peless et al. |
| 6,611,738 | B2 | 8/2003 | Ruffner |
| 6,728,607 | B1 | 4/2004 | Anderson |
| 7,332,890 | B2 | 2/2008 | Cohen et al. |
| 8,031,086 | B2 | 10/2011 | Thacher et al. |
| 8,046,103 | B2 | 10/2011 | Abramson et al. |
| 8,060,306 | B2 | 11/2011 | Puhalla et al. |
| 8,306,659 | B2 | 11/2012 | Abramson et al. |
| 8,433,468 | B2 | 4/2013 | Johnson et al. |
| 8,635,015 | B2 | 1/2014 | Anderson |
| 8,666,550 | B2 | 3/2014 | Anderson et al. |
| 9,285,804 | B2 | 3/2016 | Lee et al. |
| 2005/0075784 | A1 | 4/2005 | Gray et al. |
| 2005/0085947 | A1 | 4/2005 | Aldred et al. |
| 2006/0259212 | A1 | 11/2006 | Jeon |
| 2007/0114975 | A1 | 5/2007 | Cohen et al. |
| 2009/0254218 | A1 | 10/2009 | Sandin et al. |
| 2009/0299524 | A1 | 12/2009 | Evans et al. |
| 2010/0305752 | A1 | 12/2010 | Abramson |
| 2011/0046780 | A1 | 2/2011 | Anderson |
| 2011/0150348 | A1 | 6/2011 | Anderson |
| 2011/0153072 | A1 | 6/2011 | Anderson |
| 2011/0153136 | A1 | 6/2011 | Anderson |
| 2011/0153338 | A1 | 6/2011 | Anderson |
| 2011/0166701 | A1 | 7/2011 | Thacher et al. |
| 2011/0166705 | A1 | 7/2011 | Anderson et al. |
| 2011/0190931 | A1 | 8/2011 | Anderson et al. |
| 2011/0202224 | A1 | 8/2011 | Thompson et al. |
| 2011/0234153 | A1 | 9/2011 | Abramson |
| 2011/0295423 | A1 | 12/2011 | Anderson |
| 2011/0295424 | A1 | 12/2011 | Johnson et al. |
| 2012/0023880 | A1 | 2/2012 | Messina et al. |
| 2012/0023887 | A1 | 2/2012 | Messina et al. |
| 2012/0029752 | A1 | 2/2012 | Johnson et al. |
| 2012/0029754 | A1 | 2/2012 | Thompson et al. |
| 2012/0029755 | A1 | 2/2012 | Johnson |
| 2012/0029756 | A1 | 2/2012 | Johnson et al. |
| 2012/0083961 | A1 | 4/2012 | Sato et al. |
| 2012/0083962 | A1 | 4/2012 | Sato et al. |
| 2012/0083963 | A1 | 4/2012 | Sato et al. |
| 2012/0084020 | A1 | 4/2012 | Maier et al. |
| 2012/0101679 | A1 | 4/2012 | Anderson et al. |
| 2012/0158236 | A1 | 6/2012 | Chung et al. |
| 2012/0256752 | A1 | 10/2012 | Musser et al. |
| 2012/0265391 | A1* | 10/2012 | Letsky .................. A01D 34/008 701/25 |
| 2013/0025248 | A1 | 1/2013 | Kraft et al. |
| 2013/0056032 | A1 | 3/2013 | Choe et al. |
| 2013/0218397 | A1 | 8/2013 | Griffini et al. |
| 2013/0317680 | A1 | 11/2013 | Yamamura et al. |
| 2014/0012418 | A1 | 1/2014 | Johnson et al. |
| 2014/0012453 | A1 | 1/2014 | Johnson et al. |
| 2017/0135541 | A1 | 5/2017 | Kwak et al. |

FOREIGN PATENT DOCUMENTS

| | | |
|---|---|---|
| CN | 1576878 A | 2/2005 |
| CN | 1637432 A | 7/2005 |
| CN | 2871132 Y | 2/2007 |
| CN | 2871132 Y | 2/2007 |
| CN | 101091428 A | 12/2007 |
| CN | 101100058 A | 1/2008 |
| CN | 201641885 U | 11/2010 |
| CN | 201641885 U | 11/2010 |
| CN | 201674791 U | 12/2010 |
| CN | 102254392 A | 11/2011 |
| CN | 102254392 A | 11/2011 |
| CN | 202077380 U | 12/2011 |
| CN | 102393659 A | 3/2012 |
| CN | 102480146 A | 5/2012 |
| CN | 102480156 A | 5/2012 |
| CN | 102687625 A | 9/2012 |
| CN | 102692922 A | 9/2012 |
| CN | 102692922 A | 9/2012 |
| CN | 102759924 A | 10/2012 |
| CN | 102759924 A | 10/2012 |
| CN | 102771246 A | 11/2012 |
| CN | 102799181 A | 11/2012 |
| CN | 102811604 A | 12/2012 |
| CN | 103853154 A | 6/2014 |
| CN | 106292718 A | 1/2017 |
| DE | 102006033935 A1 | 1/2008 |
| DE | 102006045156 A1 | 4/2008 |
| DE | 102007060056 A1 | 6/2009 |
| DE | 102010041309 A1 | 3/2012 |
| DE | 102011084594 A1 | 4/2013 |
| DE | 102013203707 A1 | 9/2014 |
| EP | 247014 A2 | 11/1987 |
| EP | 550473 B1 | 12/1996 |
| EP | 808096 B1 | 11/1997 |
| EP | 1612631 B1 | 1/2006 |
| EP | 1647175 A1 | 4/2006 |
| EP | 1016946 B1 | 5/2006 |
| EP | 1745686 A1 | 1/2007 |
| EP | 1886549 A1 | 2/2008 |
| EP | 1992212 A1 | 11/2008 |
| EP | 2006708 A1 | 12/2008 |
| EP | 2026161 A1 | 2/2009 |
| EP | 2082638 A2 | 7/2009 |
| EP | 1992211 B1 | 7/2010 |
| EP | 2210466 A1 | 7/2010 |
| EP | 2241172 A1 | 10/2010 |
| EP | 2269433 A1 | 1/2011 |
| EP | 2281428 B1 | 2/2011 |
| EP | 2327610 B1 | 6/2011 |
| EP | 2413215 A2 | 2/2012 |
| EP | 2428107 B1 | 11/2012 |
| EP | 2545758 B1 | 1/2013 |
| EP | 2502481 B1 | 2/2013 |
| EP | 2279880 B1 | 3/2013 |
| EP | 2286653 B1 | 4/2013 |
| EP | 2574225 B1 | 4/2013 |
| EP | 2502482 B1 | 5/2013 |
| EP | 2586283 A1 | 5/2013 |
| EP | 2625947 A1 | 8/2013 |
| EP | 2626759 A2 | 8/2013 |
| EP | 2626760 A2 | 8/2013 |
| EP | 2626761 A2 | 8/2013 |
| EP | 2626762 A2 | 8/2013 |
| EP | 2656718 A1 | 10/2013 |
| EP | 2656719 A1 | 10/2013 |
| EP | 2657043 A1 | 10/2013 |
| EP | 2717109 A1 | 4/2014 |
| EP | 2717110 A1 | 4/2014 |
| EP | 3167784 A1 | 5/2017 |
| GB | 2277152 A | 10/1994 |
| JP | 2012105557 A | 6/2012 |
| KR | 20120067693 A | 6/2012 |
| WO | 9303399 A1 | 2/1993 |
| WO | 9526512 A1 | 1/1995 |
| WO | 9522191 A1 | 8/1995 |
| WO | 9638770 A1 | 12/1995 |
| WO | 9741451 A1 | 11/1997 |
| WO | 9801017 A1 | 1/1998 |
| WO | 9841081 A1 | 9/1998 |
| WO | 9915941 A1 | 4/1999 |
| WO | 1999028800 A1 | 6/1999 |
| WO | 9938056 A1 | 7/1999 |
| WO | 9945747 A2 | 9/1999 |
| WO | 1999059042 A1 | 11/1999 |
| WO | 9965289 A1 | 12/1999 |
| WO | 60921 A1 | 10/2000 |
| WO | 74466 A1 | 12/2000 |
| WO | 170009 A2 | 9/2001 |
| WO | 170541 A1 | 9/2001 |
| WO | 2067745 A1 | 9/2002 |
| WO | 2075356 A1 | 9/2002 |

(56) References Cited

FOREIGN PATENT DOCUMENTS

| | | |
|---|---|---|
| WO | 2075469 A1 | 9/2002 |
| WO | 2075470 A1 | 9/2002 |
| WO | 2096184 A1 | 12/2002 |
| WO | 3062937 A1 | 7/2003 |
| WO | 3065140 A2 | 8/2003 |
| WO | 3103375 A1 | 12/2003 |
| WO | 3104908 A1 | 12/2003 |
| WO | 3104909 A1 | 12/2003 |
| WO | 2004071165 A1 | 8/2004 |
| WO | 2005006098 A2 | 1/2005 |
| WO | 2005074362 A2 | 8/2005 |
| WO | 2007091967 A1 | 8/2007 |
| WO | 2008017486 A1 | 2/2008 |
| WO | 2008138967 A1 | 11/2008 |
| WO | 2008155178 A1 | 12/2008 |
| WO | 2009071379 A1 | 6/2009 |
| WO | 2009077239 A1 | 6/2009 |
| WO | 2009083319 A1 | 7/2009 |
| WO | 2009106435 A1 | 9/2009 |
| WO | 2009138140 A1 | 11/2009 |
| WO | 2010046260 A2 | 4/2010 |
| WO | WO-2010077198 A1 * | 7/2010 ........... A01D 34/008 |
| WO | 2011003667 A1 | 1/2011 |
| WO | 2011115535 A1 | 9/2011 |
| WO | 2011115536 A1 | 9/2011 |
| WO | 2011115563 A1 | 9/2011 |
| WO | 2011129728 A1 | 10/2011 |
| WO | 2011134696 A1 | 11/2011 |
| WO | 2011145989 A1 | 11/2011 |
| WO | 2012005642 A1 | 1/2012 |
| WO | 2012044220 A1 | 4/2012 |
| WO | 2012045524 A2 | 4/2012 |
| WO | 2012089679 A1 | 7/2012 |
| WO | 2012171704 A1 | 12/2012 |
| WO | 2013025135 A1 | 2/2013 |
| WO | 2013034345 A1 | 3/2013 |
| WO | 2013041278 A1 | 3/2013 |
| WO | 2013056891 A1 | 4/2013 |
| WO | 2013064301 A1 | 5/2013 |
| WO | 2013081516 A1 | 6/2013 |
| WO | 2013100833 A1 | 7/2013 |
| WO | 2013104455 A1 | 7/2013 |
| WO | 2013125991 A1 | 8/2013 |
| WO | 2013125992 A1 | 8/2013 |
| WO | 2013125995 A1 | 8/2013 |
| WO | 2014007696 A1 | 1/2014 |
| WO | 2014007728 A1 | 1/2014 |
| WO | 2014007729 A1 | 1/2014 |
| WO | 2014019224 A1 | 2/2014 |
| WO | 2014027946 A1 | 2/2014 |
| WO | 2014058358 A1 | 4/2014 |
| WO | 2010077198 A1 | 7/2017 |

OTHER PUBLICATIONS

Chinese Office Action for Chinese Application No. 2012105845096 dated Jul. 3, 2015, 13 pages.
Chinese Office Action for Application No. 2012105852259 dated Feb. 2, 2016, 19 pages.
Chinese Office Action for Chinese Application No. 2012105845096 dated Dec. 3, 2015, 14 pages.
Chinese Office Action for Chinese Application No. 2012105845096 dated May 5, 2016, 8 pages.
Chinese Office Action for Chinese Application No. 2012105845096 dated Nov. 3, 2016, 14 pages.
Chinese Office Action for Chinese Application No. 201210584509.6 dated May 4, 2017, 14 pages.
European Search Report from European Application No. 13869696.8, dated Oct. 12, 2016, 7 pages.
European Third Party Observation for European Application No. 20130869696, dated Apr. 11, 2017, 2 pages.
International Search Report for PCT Application No. PCT/CN2013/090746, dated Feb. 27, 2014, 8 pages.
International Written Opinion for PCT Application No. PCT/CN2013/090746, dated Feb. 27, 2014, 12 pages with English translation.
Weiren et al, "Research on Auto-Recharging for Home Cleaning Robot;", Chinese Journal of Scientific Instrument, vol. 31 No. 8, Aug. 2010, English Abstract, 4 pages.
Wenfeng, "Graphic and Image Processing and Application", Standards Press of China, Publication, (2006), 7 pages.

* cited by examiner

AUTO MOWING SYSTEM

CROSS-REFERENCE TO RELATED APPLICATIONS

This application is a continuation of U.S. patent application Ser. No. 14/758,424, filed Sep. 2, 2015, now U.S. Pat. No. 9,820,433, issued Nov. 21, 2017, which is a national phase entry under 35 U.S.C. § 371 of International Patent Application PCT/CN2013/090746, filed Dec. 27, 2013, designating the United States of America and published as International Patent Publication WO 2014/101840 A1 on Jul. 3, 2014, which claims the benefit under Article 8 of the Patent Cooperation Treaty and under 35 U.S.C. § 119(e) to Chinese Patent Application Serial No. 201210585225.9, filed Dec. 28, 2012, and Chinese Patent Application Serial No. 201210584509.6, filed Dec. 28, 2012, the disclosure of each of which is hereby incorporated herein in its entirety by this reference.

TECHNICAL FIELD

The present disclosure relates to a robotic mowing system.

BACKGROUND

With continuous development of computer technologies and artificial intelligence technologies, a robotic drive device that is similar to an intelligent robot has gradually entered people's lives. Companies such as Samsung and Electrolux have both developed fully automatic vacuum cleaners that have entered the market. This fully automatic vacuum cleaner is usually of a small size, integrates with an environment sensor, has a self-drive system, a vacuum system, a battery system and a charging system, can move around indoors on its own without human control, and when power is low, automatically returns to a station, connects to the station to be charged, and then continues to move around and perform vacuum cleaning. Meanwhile, companies such as Husqvarna have developed a similarly intelligent mower that can automatically mow a user's lawn and perform charging without involvement of the user. Because this robotic mowing system, once set, needs no effort for later management, the user is liberated from boring and time-consuming housework such as cleaning and lawn care and, therefore, is greatly welcomed.

An existing robotic mower is generally applied to a working area with a relatively large size, such as 1000 square meters. When working, the user needs to input working parameters such as the size of a working area and a working time, and the robotic mower stops moving when those parameters are achieved. For example, after calculating or estimating the size of a working area, the user inputs a value of the area size into the robotic mower, and the robotic mower automatically calculates a working time required for completing the size, starts a timer, and stops moving when the timer reaches the calculated working time. For a working area having a relatively small size, such as 50 to 200 square meters, the user still needs to input working parameters to control the working time of the robotic mower. In this scenario, it is troublesome, and costs are relatively high.

Therefore, it is necessary to improve the existing robotic mower and station so that the user does not need to input working parameters and where costs can be reduced.

BRIEF SUMMARY

In view of the shortcomings of the prior art, the present disclosure provides a robotic mowing system in which a user does not need to input working parameters, and costs are relatively low.

The technical solutions of the present disclosure are implemented in this way:

A robotic mowing system comprises a station 200 and a robotic mower 100, wherein the robotic mower 100 has a controller 110, a memorizer 120, a power source 50 and a drive motor 30. The memorizer 120 stores a fixed working procedure, and after receiving a start command input by a user, the controller 110 executes the working procedure so as to control the robotic mower 100 to automatically and repeatedly mow and return to the station 200 to be charged, until the controller 110 receives a stop command.

Preferably, the working procedure comprises the following steps: starting the drive motor 30; controlling the robotic mower 100 to enter a predetermined working area; controlling the robotic mower 100 to mow according to a predetermined route or a random route; detecting power or a discharge time of the power source 50, and if the power of the power source 50 is lower than a first predetermined value or the discharge time reaches a first predetermined time, controlling the robotic mower 100 to return to the station 200 to be charged; and detecting the power or a charging time of the power source 50, and if the power of the power source 50 reaches a second predetermined value or the charging time reaches a second predetermined time, controlling the robotic mower 100 to mow again.

Preferably, the robotic mowing system further comprises a physical boundary apparatus that is configured to form a boundary line to define the working area, the robotic mower working inside the working area 300.

Preferably, the physical boundary apparatus comprises several independent wireless generators that are configured to generate a wireless signal as a boundary signal, and the robotic mower 100 is provided with a wireless receiver that detects the boundary signal.

Preferably, the wireless generator is an infrared generator, and the wireless receiver is an infrared receiver.

Preferably, the robotic mowing system further comprises a virtual boundary apparatus configured to define the working area 300 of the robotic mower.

Preferably, the virtual boundary apparatus, disposed inside the robotic mower 100, is a global positioning module, a photographing module or a lawn identification module, the global positioning module performing wireless communication with a positioning satellite, and forming a virtual boundary by using a predetermined position coordinate sequence, the photographing module shooting an image of the robotic mower and the surrounding area, and delineating a virtual boundary on the image, and the lawn identification module determines whether the ground is a lawn according to a color or dampness of a lawn.

Preferably, the controller 110 controls the robotic mower 100 to return to the station 200 along a boundary of the working area 300.

Preferably, the controller 110 controls the robotic mower 100 to return directly toward the station 200.

Preferably, the station 200 is provided with at least one ultrasonic generator, the robotic mower 100 is provided with at least one ultrasonic receiver, so that when the robotic mower 100 goes back, the controller 110 adjusts a moving direction of the robotic mower 100 according to a receiving condition of the ultrasonic receiver, so that the robotic mower returns toward the station 200.

Preferably, the station 200 is provided with the ultrasonic generator and an infrared generator, the robotic mower 100 is provided with the ultrasonic receiver and an infrared receiver, the ultrasonic generator and the ultrasonic receiver are configured to guide the robotic mower 100 to return toward the station 200, and the infrared generator and the infrared receiver are configured to guide the robotic mower 100 to connect to the station 200 to be charged.

Preferably, the robotic mower 100 further comprises an operation interface for a user to operate, the operation interface is provided with only a power button 150, a start button 130 and a stop button 140. The power button 150 is used for turning the power to the robotic mower 100 on or off. The start command is generated when the start button 130 is pressed down, and the stop command is generated when the stop button 140 is pressed down.

In the present disclosure, at least a part of a boundary of a working area is a physical boundary. A robotic mower is provided with a physical boundary signal generator, a physical boundary signal receiver and a controller. A first boundary signal is reflected when reaching the physical boundary. The physical boundary signal receiver receives the reflected first boundary signal, and the controller determines a distance between the robotic mower and the physical boundary. In this way, no other boundary line needs to be arranged, and costs are relatively low.

BRIEF DESCRIPTION OF THE DRAWINGS

The present disclosure is further described below with reference to the accompanying drawings and embodiments.

DETAILED DESCRIPTION

Figure 1:
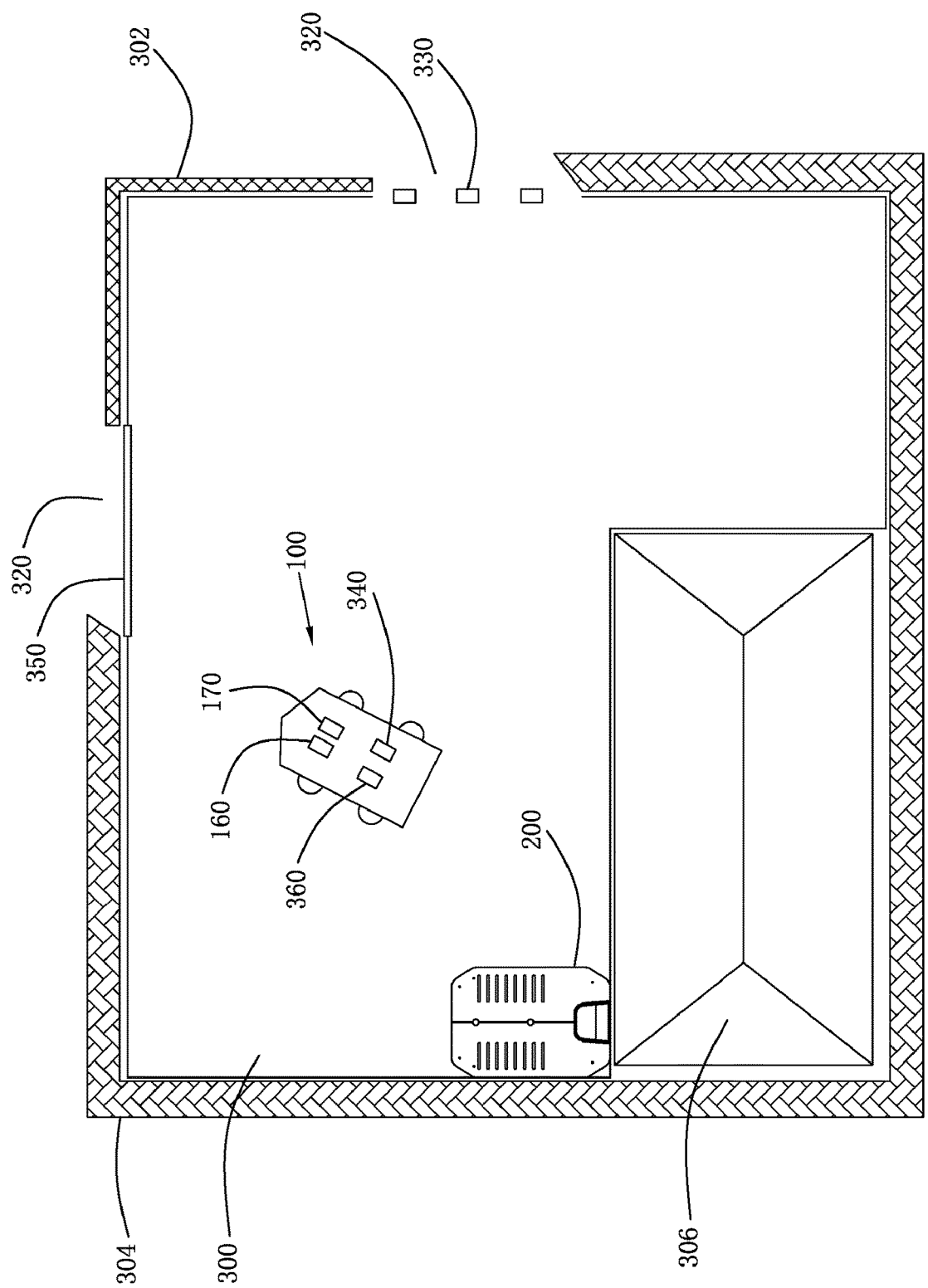
FIG. 1 is a schematic diagram of working of a robotic mower inside a working area according to the present disclosure.

Referring to FIG. 1, a robotic mower 100 is configured to move and mow in a predetermined working area 300. A station 200 is provided inside the working area 300 or at a boundary of the working area 300, and is configured to recharge the robotic mower 100 when the robotic mower 100 is short of power and goes back to be charged, or to provide a shelter from rain or a stop for the robotic mower 100.

At least a part of the boundary of the working area 300 is a physical boundary, such as a fence 302, a wall 304 or a wall of a house 306. In this embodiment, the physical boundary forms most of the boundary of the working area 300.

Figure 2:
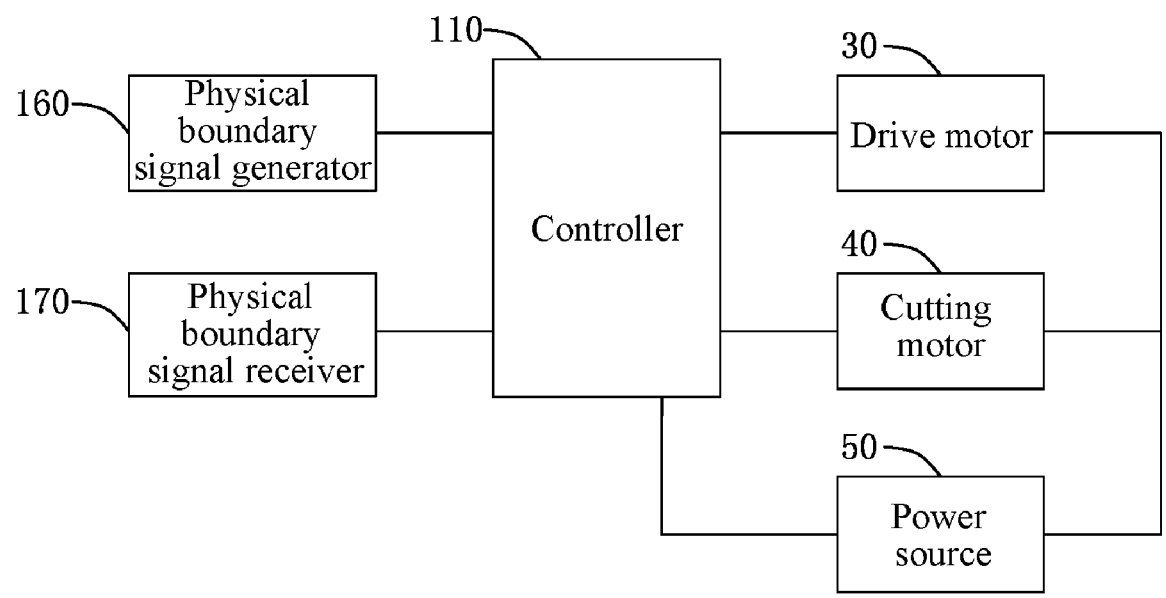
FIG. 2 is a schematic block diagram of the robotic mower of FIG. 1.

Referring to FIG. 2, the robotic mower 100 includes a housing (not shown), several wheels (also not shown) that are disposed at the bottom of the housing, at least one drive motor 30 that is configured to drive the wheels, a cutting blade 42 (see FIG. 6) that is used for cutting, a cutting motor 40 that is configured to drive the cutting blade 42, a power source 50 that supplies power to the drive motor 30 and the cutting motor 40, a controller 110, a physical boundary signal generator 160 and a physical boundary signal receiver 170.

The controller 110 is connected to the drive motor 30, the cutting motor 40, the power source 50, the physical boundary signal generator 160 and the physical boundary signal receiver 170.

The physical boundary signal generator 160 and the physical boundary signal receiver 170 are configured to sense the physical boundary of the working area 300. When the robotic mower 100 is close to the boundary, the controller 110 controls the robotic mower 100 to change its moving direction and to return to the working area. In this embodiment, the wheels have a left drive wheel and a right drive wheel. The drive motor 30 includes a left drive motor and a right drive motor. The left drive motor is configured to drive the left drive wheel, and the right drive motor is configured to drive the right drive wheel. The controller 110 controls the left drive motor and the right drive motor to rotate at different rotation rates, so as to control the robotic mower 100 to change the moving direction to return to the working area.

The physical boundary signal generator 160 is configured to generate a first boundary signal. The first boundary signal is reflected when reaching the physical boundary. The physical boundary signal receiver 170 receives the reflected first boundary signal. After the physical boundary signal receiver 170 receives the reflected first boundary signal, the controller 110 determines whether the robotic mower 100 is close to the physical boundary.

Further, the controller 110 stores a predetermined distance value. When it is calculated that a distance value between the robotic mower 100 and the physical boundary is greater than the predetermined distance value, the controller 110 keeps the moving direction of the robotic mower 100 unchanged. When it is calculated that the distance value between the robotic mower 100 and the physical boundary is less than or equal to the predetermined distance value, the controller 110 determines that the robotic mower 100 is close to the physical boundary and controls the robotic mower 100 to change its direction, preventing the robotic mower 100 from crashing into the physical boundary, enabling the robotic mower 100 to remain within the working area 300.

Specifically, the first boundary signal is an ultrasonic signal, the physical boundary signal generator 160 is an ultrasonic generator, and the physical boundary signal receiver 170 is an ultrasonic receiver. The controller 110 calculates a distance between the robotic mower 100 and the physical boundary according to a time difference between generating and receiving the ultrasonic signal.

The first boundary signal may also be a laser signal, the physical boundary signal generator 160 is a laser generator, and the physical boundary signal receiver 170 is a laser receiver. The controller 110 calculates a distance between the robotic mower 100 and the physical boundary according to a time difference between generating and receiving the laser signal. A handheld laser rangefinder that integrates the physical boundary signal generator 160 and the physical boundary signal receiver 170 may be used, which has a detection range within 200 m, plus or minus 2 mm.

The first boundary signal may also be a boundary infrared signal, the physical boundary signal generator 160 is a first infrared generator, and the physical boundary signal receiver 170 is a first infrared receiver. Because attenuation of the boundary infrared signal is strong in a propagation process, when being relatively far from the physical boundary, the first infrared receiver cannot effectively identify the boundary infrared signal. In addition, a user may set, according to needs, a distance at which the first infrared receiver identifies the boundary infrared signal. For example, after the boundary infrared signal is generated and returns for a predetermined distance, intensity of the boundary infrared signal reduces to a predetermined intensity value. When intensity of the reflected boundary infrared signal that reaches the first infrared receiver is greater than or equal to the predetermined intensity value, the first infrared receiver identifies the boundary infrared signal. In this case, the controller 110 determines that the robotic mower 100 is close to the physical boundary, and controls the robotic mower 100 to change its direction.

Referring again to FIG. 1, a part of the boundary of the working area 300 is a virtual boundary, and has no physical boundary, such as an entrance of a courtyard, that is, there is an opening 320. The virtual boundary is provided with at least one virtual boundary signal generator, and the robotic mower 100 is provided with a virtual boundary signal receiver. The virtual boundary signal generator generates a second boundary signal. After the virtual boundary signal receiver receives the second boundary signal, the controller 110 determines that the robotic mower 100 has reached the boundary.

In this embodiment, the virtual boundary signal generator is a radio frequency identification ("RFID") tag 330, and the virtual boundary signal receiver is a radio frequency reader 340. At least one radio frequency identification tag 330 is disposed at the opening 320, and the radio frequency reader 340 is disposed at the bottom or a side surface of the housing of the robotic mower 100, and is configured to generate a first radio frequency signal. When the robotic mower 100 is close to the radio frequency identification tag 330, the radio frequency identification tag 330 receives the first radio frequency signal and generates a second radio frequency signal. When the radio frequency reader 340 receives the second radio frequency signal, the controller 110 determines that the robotic mower 100 has reached the boundary.

The virtual boundary signal generator may also be a metal marker, such as a metal strip 350, and the virtual boundary signal receiver is a metal detector 360. At least one metal strip 350 is disposed at opening 320 along a direction of the boundary. The metal detector 360 is disposed on the robotic mower 100, and is configured to detect the metal strip 350. The metal detector 360 has an oscillator circuit (not shown) that is configured to generate an electromagnetic induction signal. When there is metal existing around the metal detector 360, the metal generates electromagnetic induction and an eddy current is generated, so that power consumption of the oscillator circuit in the metal detector 360 increases, and oscillation weakens and even stops. Change of the oscillation is detected and converted into a light signal or a sound signal, so that whether the metal strip 350 exists may be detected. When the metal detector 360 detects the metal strip 350, the controller 110 determines that the robotic mower 100 has reached the boundary.

In another embodiment, the virtual boundary signal generator may also be a magnet (not shown). The virtual boundary signal receiver is a magnetic sensor (also not shown) that is configured to sense a magnetic field generated by the magnet. When the magnetic sensor detects the magnetic field of the magnet, the controller 110 determines that the robotic mower 100 has reached the boundary.

In this embodiment, the controller 110 further detects residual power of the power source 50. When the residual power of the power source 50 is lower than a certain value, the controller 110 controls the robotic mower 100 to return to the station 200 to replenish power.

In this embodiment, at least one metal strip 350 is connected to the station 200, and is disposed in parallel to the physical boundary. In a process in which the robotic mower 100 returns to the station 200, the controller 110 first controls the robotic mower 100 to move along the boundary of the working area 300 in a predetermined direction, such as in a clockwise or counterclockwise direction. When the robotic mower 100 is close to the station 200, the metal detector 360 detects the metal strip 350, and the controller 110 controls the robotic mower 100 to move forward along the metal strip 350 and to connect to the station 200. In another embodiment, the metal strip 350 may also not be parallel to the physical boundary.

The station 200 is provided with a return signal generator that is configured to generate a return signal. The robotic mower 100 is provided with a return signal receiver that is configured to receive a return signal. The controller 110 controls the robotic mower 100 to move toward the return signal generator, so as to enable the robotic mower 100 to return to the station 200.

Figure 3:
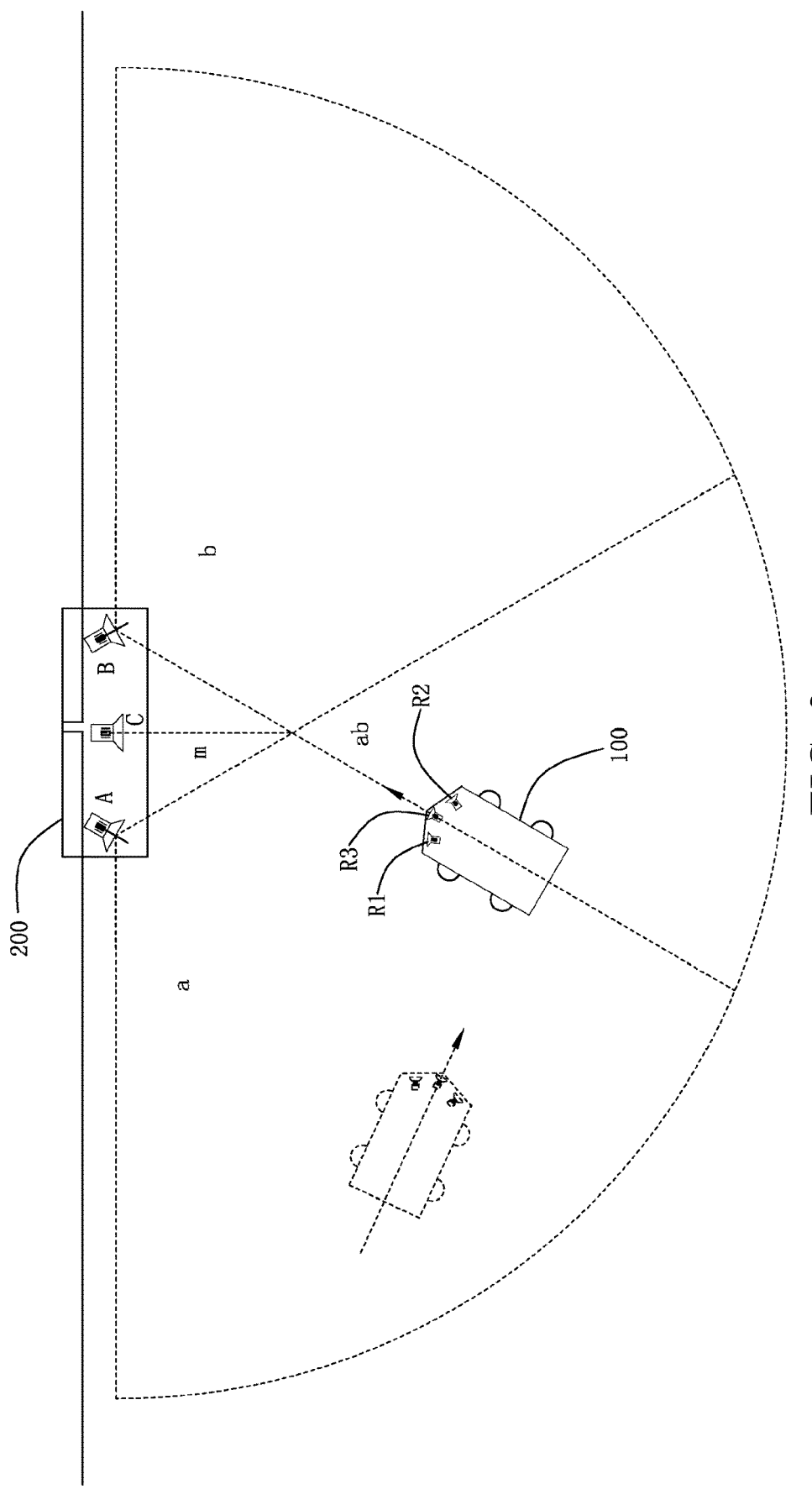
FIG. 3 is a schematic diagram of the robotic mower of FIG. 1 when returning to a station.
Figure 4:
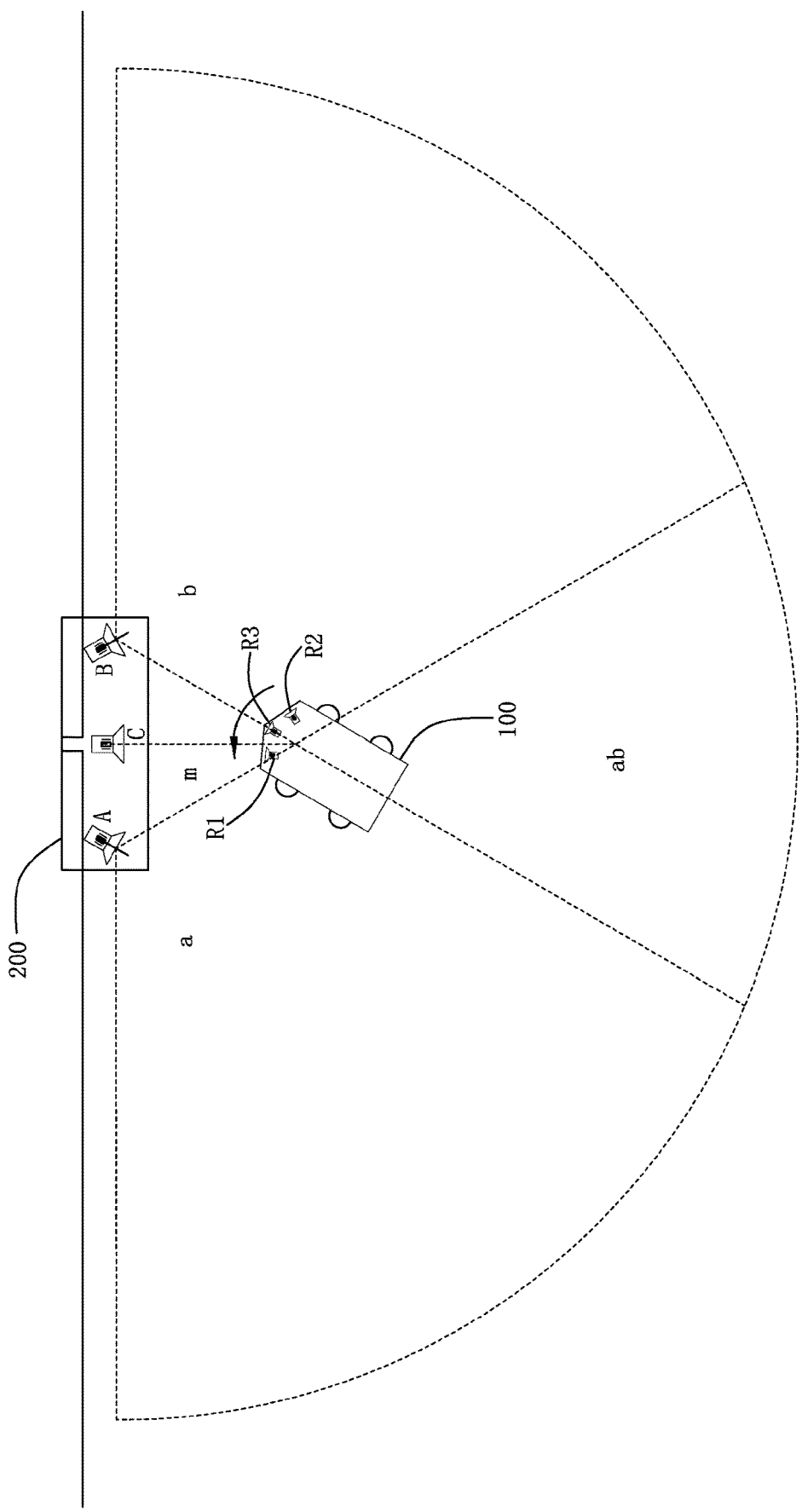
FIG. 4 is another schematic state diagram of the robotic mower of FIG. 3 in a process of returning to a station.

Referring to FIGS. 3 and 4, the return signal generator includes a first ultrasonic generator A, a second ultrasonic generator B and a second infrared generator C. When the robotic mower 100 returns to the station 200, the controller 110 adjusts a moving direction of the robotic mower 100 according to the condition of the receiving signals of the first ultrasonic generator A and the second ultrasonic generator B, so that the robotic mower 100 returns directly toward the station 200. When the robotic mower 100 is close to the station 200, the controller 110 controls the robotic mower 100 to keep receiving a return infrared signal of the second infrared generator C, so that the robotic mower 100 connects to the station 200 to be charged.

Specifically, the two ultrasonic generators A and B are separately located at two sides of the second infrared generator C. The first ultrasonic generator A is configured to generate a first ultrasonic signal, the second ultrasonic generator B is configured to generate a second ultrasonic signal of which a frequency or intensity is different from that of the first ultrasonic signal, and the second infrared generator C is configured to generate a return infrared signal that is linear.

Emission angles of the two ultrasonic generators A and B are partly overlapped, so that a surrounding area of the station 200 is divided into several sub-areas: a single signal coverage, an overlapping region ab and a middle region m. The single signal coverage includes a first signal coverage a that covers only the first ultrasonic signal and a second signal coverage b that covers only the second ultrasonic signal. The overlapping region ab covers the first ultrasonic signal and the second ultrasonic signal.

The robotic mower 100 is provided with a first ultrasonic receiver R1, a second ultrasonic receiver R2 and a second infrared receiver R3. In this embodiment, the first ultrasonic receiver R1 or the second ultrasonic receiver R2 may also be used, when in normal functionality, as the physical boundary signal receiver 170 to receive the first boundary signal, thereby reducing hardware costs.

The second infrared receiver R3 is located at a middle part of a front portion of the robotic mower 100. The ultrasonic receivers R1 and R2 are separately disposed at two sides of the second infrared receiver R3 on the robotic mower 100.

When the robotic mower 100 needs to go back or receives a return signal for the first time, the controller 110 controls the robotic mower 100 to first revolve in a circle to perform initial position judgment to determine a sub-area to which the robotic mower 100 currently belongs. If after the robotic mower 100 revolves in a circle, the first ultrasonic receiver R1 or the second ultrasonic receiver R2 receives only the first ultrasonic signal, the controller 110 determines that the current sub-area is the first signal coverage a. If after the robotic mower 100 revolves in a circle, the first ultrasonic receiver R1 or the second ultrasonic receiver R2 receives only the second ultrasonic signal, the controller 110 determines that the current sub-area is the second signal coverage b. If after the robotic mower 100 revolves in a circle, the first ultrasonic receiver R1 and/or the second ultrasonic receiver R2 receives the first ultrasonic signal and the second ultrasonic signal, the controller 110 determines that the current sub-area is the first overlapping region ab. If after the robotic mower 100 revolves in a circle, the first ultrasonic receiver R1 and/or the second ultrasonic receiver R2 does not receive the ultrasonic signal that is used as the return signal, the controller 110 controls the robotic mower 100 to continue moving according to a predetermined route or a random route.

If an initial position of the robotic mower 100 is the first signal coverage a, the controller 110 controls the robotic mower 100 to revolve until only the first ultrasonic receiver R1 receives the first ultrasonic signal. As shown by a dashed part in FIG. 3, at this time, a direction of the robotic mower 100 is a moving direction, and the robotic mower 100 is controlled to enter the overlapping region ab. Similarly, when the initial position of the robotic mower 100 is the second signal coverage b, the controller 110 controls the robotic mower 100 to revolve until only the second ultrasonic receiver R2 receives the second ultrasonic signal, and a direction of the robotic mower 100 at this time is used as the moving direction.

When the robotic mower 100 enters the first overlapping region ab from the first signal coverage a, the first ultrasonic receiver R1 receives the first ultrasonic signal and the second ultrasonic signal, and the controller 110 controls the robotic mower 100 to revolve until the first ultrasonic receiver R1 and the second ultrasonic receiver R2 both receive the first ultrasonic signal and the second ultrasonic signal to enable the robotic mower 100 to face toward the station 200. Then, the controller 110 continues to control the robotic mower 100 to enable both first ultrasonic receiver R1 and second ultrasonic receiver R2 to keep receiving the first ultrasonic signal and the second ultrasonic signal.

An extreme case in which the robotic mower 100 is located in the overlapping region ab is when the robotic mower 100 is located at a signal boundary of a left side of the second ultrasonic generator B. In this case, the controller 110 controls the robotic mower 100 to enable the first ultrasonic receiver R1 to keep receiving the first ultrasonic signal and the second ultrasonic receiver R2 to keep receiving the second ultrasonic signal. The robotic mower 100 moves forward along the signal boundary of the left side of the second ultrasonic generator B.

Similarly, when the robotic mower 100 enters the first overlapping region ab from the second signal coverage b, the second ultrasonic receiver R2 receives both the first ultrasonic signal and the second ultrasonic signal, and the controller 110 controls the robotic mower 100 to revolve until the first ultrasonic receiver R1 and the second ultrasonic receiver R2 both receive the first ultrasonic signal and the second ultrasonic signal. In this case, an extreme case is when the controller 110 controls the robotic mower 100 to move forward along a signal boundary of a right side of the first ultrasonic generator A.

If the initial position of the robotic mower 100 is the first overlapping region ab, the controller 110 still controls the robotic mower 100 to revolve until the first ultrasonic receiver R1 and the second ultrasonic receiver R2 both receive the first ultrasonic signal and the second ultrasonic signal.

With continued reference to FIG. 4, when the robotic mower 100 is about to leave the first overlapping region ab and to enter the middle region m, if the first ultrasonic receiver R1 does not receive an ultrasonic signal, the controller 110 controls the robotic mower 100 to revolve in a counterclockwise direction until the second infrared receiver R3 receives the return infrared signal, so as to enable the robotic mower 100 to face directly toward the station 200. Thereafter, the controller 110 maintains a moving direction of the robotic mower 100 so that accurate and precise connection of the robotic mower 100 and the station 200 is implemented.

Similarly, when the robotic mower 100 is about to leave the first overlapping region ab and to enter the middle region m, if the second ultrasonic receiver R2 does not receive an ultrasonic signal, the controller 110 controls the robotic mower 100 to revolve in a clockwise direction until the second infrared receiver R3 receives the return infrared signal so as to enable the robotic mower 100 to face directly toward the station 200.

Initial position judgment, entering area judgment and a control manner of the robotic mower 100 within a coverage range of the generators are shown in Table 1:

TABLE 1

| Signal coverage | Initial position judgment (Revolve in a circle) | Entering area judgment | Control manner |
| --- | --- | --- | --- |
| a | Only a signal of A is received | | Only a left side receives the signal of A |
| b | Only a signal of B is received | | Only a right side receives the signal of B |
| ab | Signals of A and B are received | Any side receives simultaneously the signal of A and the signal of B | The left side and the right side both receive the signals of A and B |

To identify the first boundary signal, the first ultrasonic signal and the second ultrasonic signal that are all ultrasonic, the first boundary signal has a first frequency, the first ultrasonic signal has a second frequency, and the second ultrasonic signal has a third frequency. The controller 110 stores a preset first frequency corresponding to the first frequency, a preset second frequency corresponding to the second frequency, and a preset third frequency corresponding to the third frequency. If a frequency of a wireless signal received by the physical boundary signal receiver 170 matches the preset first frequency, the controller 110 determines that the wireless signal is the first boundary signal. If a frequency of a wireless signal received by the first ultrasonic receiver R1 matches the preset second frequency, the controller 110 determines that the wireless signal is the first ultrasonic signal. Finally, if a frequency of a wireless signal received by the second ultrasonic receiver R2 matches the preset third frequency, the controller 110 determines that the wireless signal is the second ultrasonic signal.

In this embodiment, at least a part of a boundary of a working area of the robotic mower 100 is a physical boundary. The robotic mower 100 has a physical boundary signal generator 160, a physical boundary signal receiver 170 and a controller 110. The physical boundary signal generator 160 generates a first boundary signal, and the first boundary signal is reflected after reaching the physical boundary. After the physical boundary signal receiver 170 receives the reflected first boundary signal, the controller 110 determines a distance between the robotic mower 100 and the physical boundary, so as to identify the boundary. In this way, no other boundary line needs to be arranged, and costs are relatively low.

Figure 5:
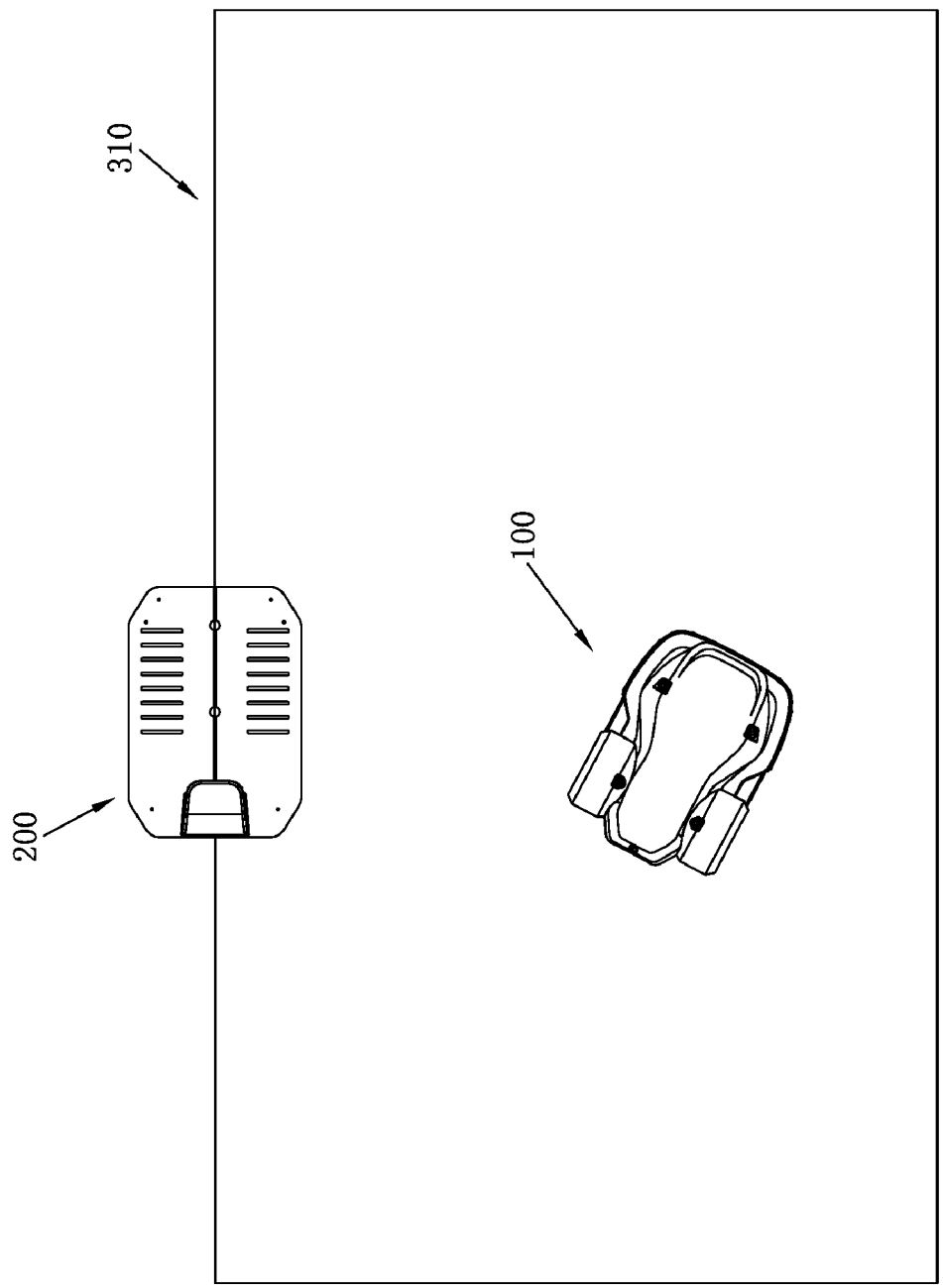
FIG. 5 is a schematic diagram of a robotic mowing system according to the present disclosure.

Referring to FIG. 5, the present disclosure further provides a robotic mowing system that includes a robotic mower 100, a station 200 and a boundary apparatus. The boundary apparatus is configured to define a range of the working area. The robotic mower 100 is configured to move and mow in the working area. The station 200 is configured to recharge the robotic mower 100 when the robotic mower 100 is short of power and goes back, or to provide a shelter from rain or a stop for the robotic mower 100.

Figure 6:
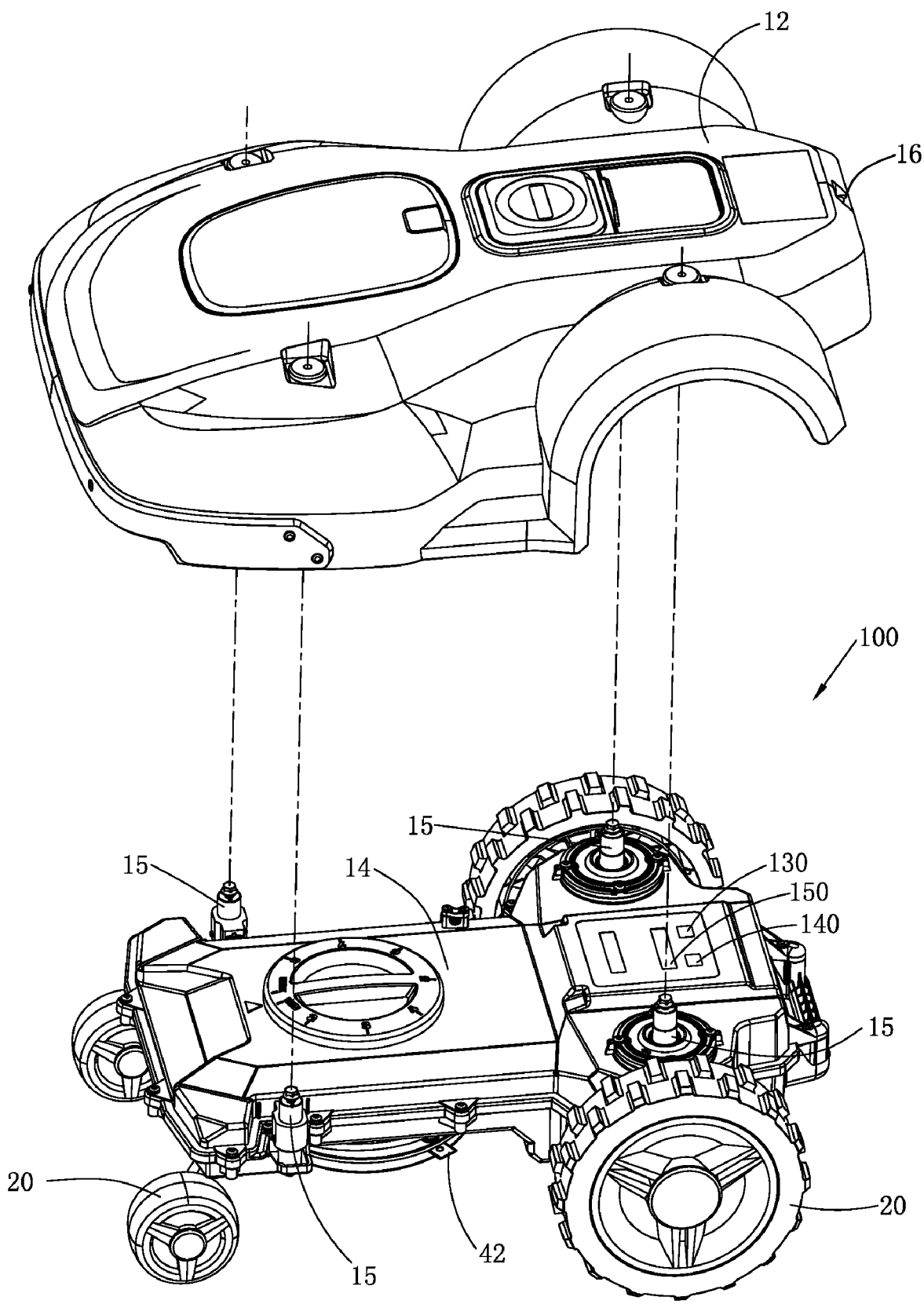
FIG. 6 is a schematic exploded diagram of the robotic mower of FIG. 5.
Figure 7:
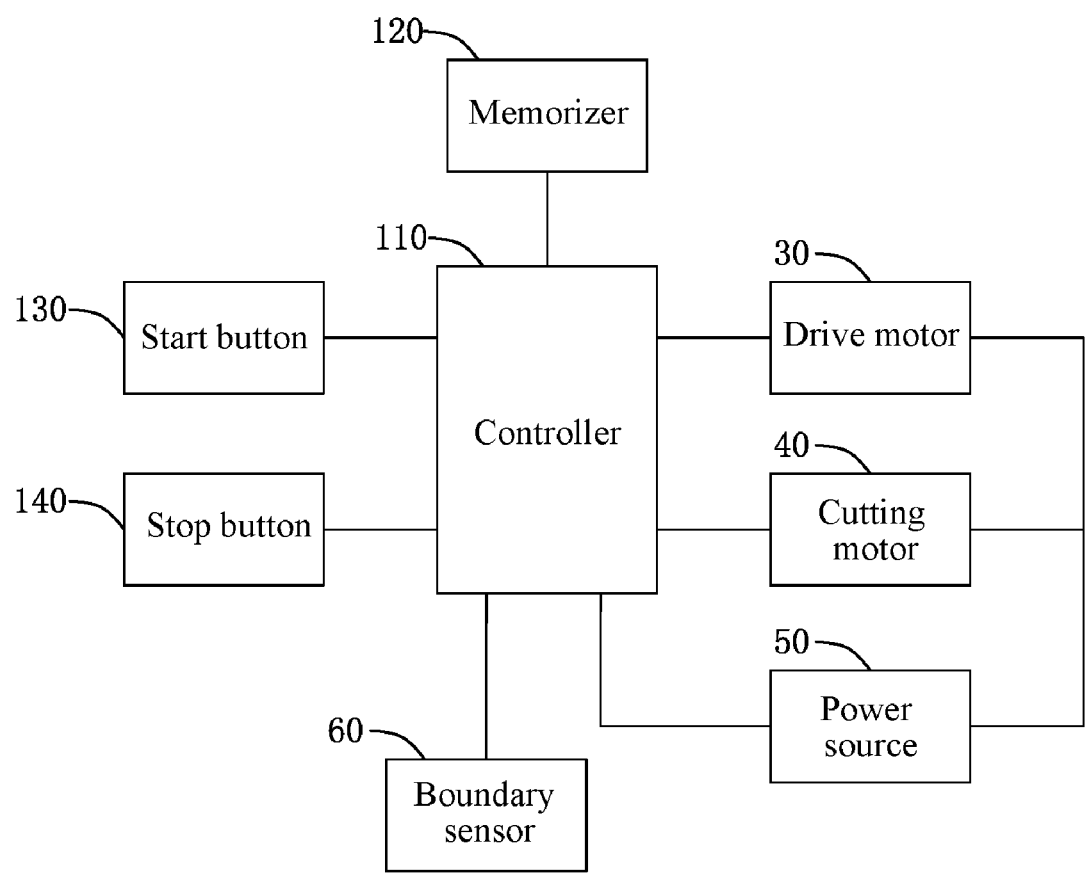
FIG. 7 is a schematic block diagram of the robotic mower of FIG. 5.

Referring to FIGS. 6 and 7 at the same time, the robotic mower 100 includes a housing that extends along a longitudinal direction, several wheels 20 that are disposed at the bottom of the housing, at least one drive motor 30 that is disposed inside the housing and is configured to drive the wheels 20, a cutting blade 42 that is disposed at the bottom of the housing and is used for cutting, a cutting motor 40 that is disposed inside the housing and is configured to drive the cutting blade 42, a power source 50 that supplies power to the drive motor 30 and the cutting motor 40.

The robotic mower 100 further includes a controller 110, a memorizer 120, an operation interface and a boundary sensor 60.

The memorizer 120 stores a fixed working procedure. The operation interface is provided with only a start button 130, a stop button 140 and a power button 150. The controller 110 is connected to the memorizer 120, the power source 50, the start button 130, the stop button 140, the drive motor 30, the cutting motor 40 and the boundary sensor 60. The power button 150 is connected to the power source 50.

The boundary sensor 60 is configured to sense the boundary of the working area. When the robotic mower 100 mows normally, and when the boundary sensor 60 senses the boundary, the controller 110 controls the robotic mower 100 to change its moving direction to return to the working area. In this embodiment, the wheels 20 include a front wheel, a left drive wheel and a right drive wheel. The drive motor 30 includes a left drive motor and a right drive motor. The left drive motor is configured to drive the left drive wheel, and the right drive motor is configured to drive the right drive wheel. The controller 110 controls the left drive motor and the right drive motor to rotate at different rotation rates, so as to cause the robotic mower 100 to change its moving direction to return to the working area.

When the power button 150 is pressed down, the power source 50 is turned on or off. A start command is generated when the start button 130 is pressed down, and a stop command is generated when the stop button 140 is pressed down. When receiving the start command, the controller 110 executes the working procedure in the memorizer 120, so as to control the robotic mower 100 to automatically and repeatedly mow and return to the station 200 to be charged, until the controller 110 receives the stop command. In another embodiment, the start button 130 and the stop button 140 may also be combined into one.

Figure 8:
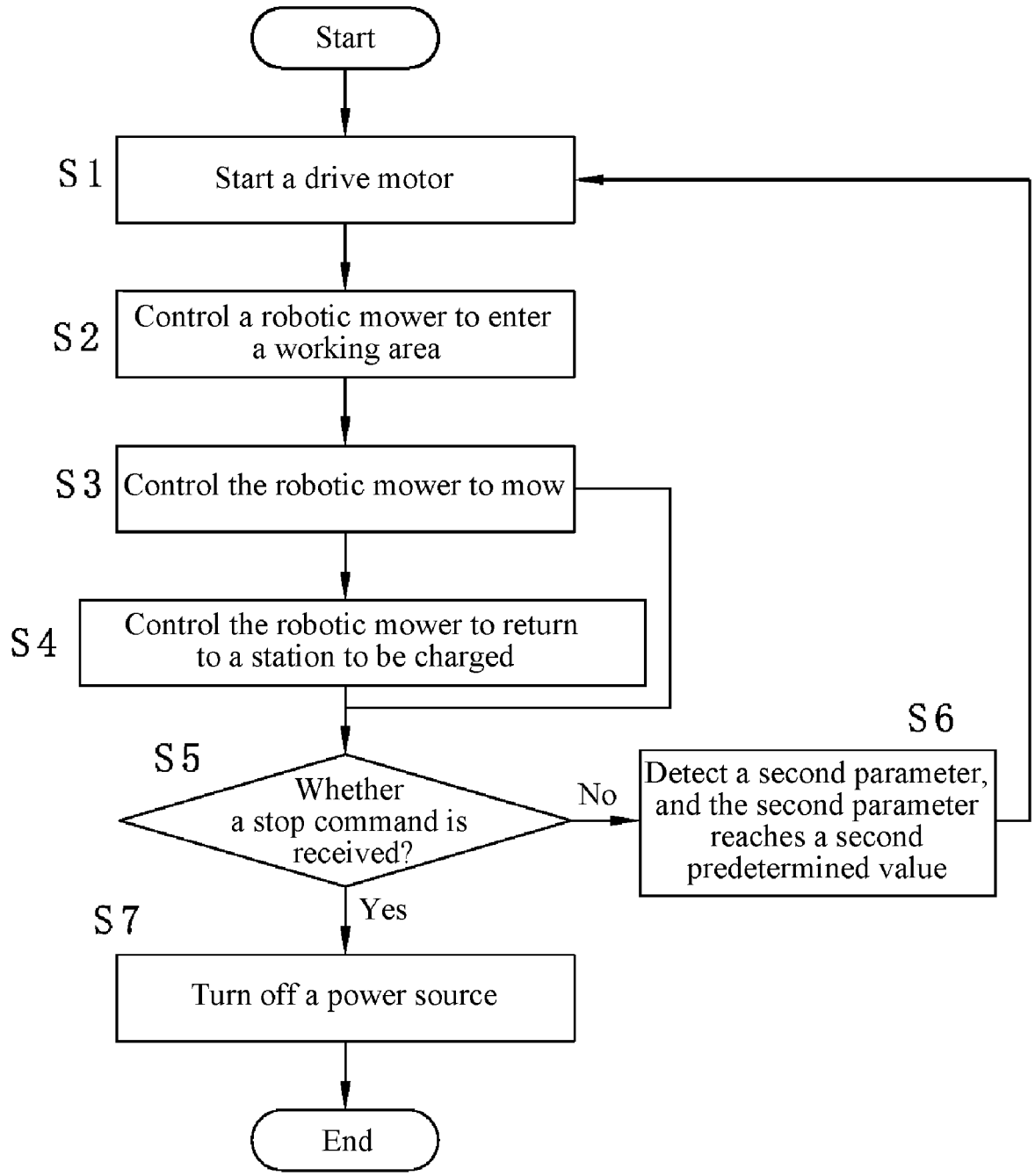
FIG. 8 is a schematic flowchart of a working procedure of a robotic mowing system according to the present disclosure.

Referring to FIG. 8, the working procedure includes the following steps:

Step S1: Start the drive motor 30.

Step S2: Control the robotic mower 100 to enter the working area.

Step S3: Control the robotic mower 100 to mow according to a predetermined route or a random route.

Step S4: Detect at least one first parameter of the robotic mower 100. If the first parameter reaches a first predetermined value, control the robotic mower 100 to return to the station 200 to be charged. In this embodiment, the first parameter is a working time. The controller 110 starts timing when the robotic mower 100 starts. When the timing reaches a predetermined value, the controller 110 controls the robotic mower 100 to return to the station 200. In another embodiment, the first parameter may also be power of the power source 50. When it is detected that the power of the power source 50 is lower than a predetermined value, the robotic mower 100 returns to the station 200 to be charged. In this embodiment, the power of the power source 50 is implemented by detecting voltage of the power source 50.

Step S5: Determine whether a stop command is received in a process in which the robotic mower 100 mows or is recharged. If the stop command is received, perform step S7; otherwise, perform step S6.

Step S6: Detect at least one second parameter of the power source 50. If the second parameter reaches a second predetermined value, go back to step S1, and so forth. In this embodiment, the second parameter is power of the power source 50, and when it is detected that the power of the power source 50 reaches a predetermined value, go back to step S1. In another embodiment, the second parameter may also be a charging time. Start timing when the robotic mower 100 connects to the station 200 to be charged, and if a predetermined time is reached, go back to step S1.

Step S7: Turn off the power source 50.

In conclusion, the controller 110 of the robotic mower 100 executes the foregoing working procedure, so that when working in a working area having a relatively small working area size, for example, 50 to 200 square meters, the robotic mower 100 automatically and repeatedly mows and returns to the station 200 to be charged (as long as a start command is received) until a stop command is received. In this way, a user does not need to input working parameters, and costs are relatively low.

The boundary apparatus may be a physical boundary apparatus or a virtual boundary apparatus. The physical boundary apparatus is set independently of the robotic mower 100, and is configured to form a boundary line to define the working area. The virtual boundary apparatus, which may be disposed on the robotic mower 100 or outside the working area, detects surrounding environments of the robotic mower 100, and determines, according to detected data, whether the robotic mower 100 is located inside the working area.

Further referring to FIG. 5, the physical boundary apparatus may be a wire 310 that is electrically connected to the station 200. The wire and the station 200 form a closed circuit to generate a magnetic signal. The boundary sensor 60 of the robotic mower 100 is a magnetic induction device that detects a boundary signal. The controller 110 determines, according to a magnetic field direction detected by a magnetic induction device, whether the robotic mower 100 is located inside the working area.

The physical boundary apparatus may be several independent wireless generators. The wireless generators are configured to generate a wireless signal as the boundary signal. The boundary sensor 60 of the robotic mower 100 is a wireless receiver that detects the wireless signal. The controller 110 determines, according to whether the wireless receiver receives a wireless signal, whether the robotic mower 100 is located inside the working area. A portable wireless generator is used as a boundary apparatus so that the user can alter or change the working area quickly.

Figure 9:
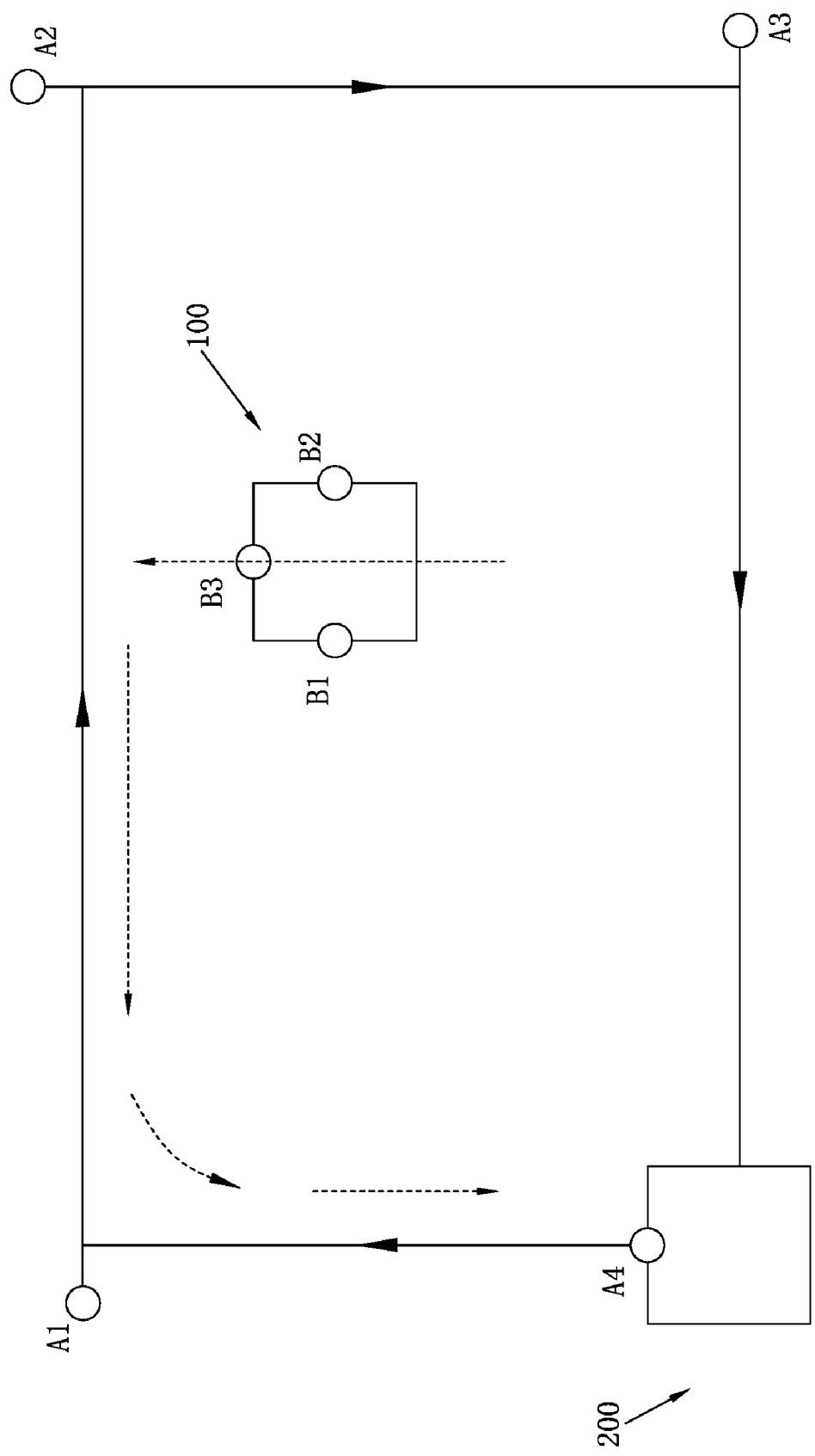
FIG. 9 is a schematic diagram of another embodiment of a robotic mowing system according to the present disclosure.

Referring to FIG. 9, in another embodiment of the robotic mowing system of the present disclosure, the wireless generators are infrared generators A1, A2, A3 and A4. Infrared signals generated by the infrared generators A1, A2, A3 and A4 are used as the boundary line to form a closed, or basically closed, polygonal area so as to define the working area of the robotic mower 100. In an embodiment, the infrared generators A1, A2, A3 and A4 are all located at corners of a polygon and, in this case, the polygonal area formed by infrared signals generated by the infrared generators A1, A2, A3 and A4 are closed.

In this embodiment, the infrared generators A1, A2 and A3 are separately located at boundary extension lines of three corners of the polygon. The station 200 is also located at a boundary extension line of a corner. The infrared generator A4 is disposed at a side surface facing the boundary of the station 200. In this case, the polygonal area formed by infrared signals generated by the infrared generators A1, A2, A3 and A4 is not totally closed, and a gap is formed at the station 200, which does not affect implementation of the robotic mowing system of the present disclosure.

In this embodiment, the infrared generators A1, A2 and A3 are provided with independent batteries or wind power generation apparatuses, so as to have independent power supplies. The infrared generator A4 is powered by the station 200.

The wireless receivers are infrared receivers B1 and B2 that are disposed at side surfaces of the robotic mower 100. When the infrared receiver B1 or the infrared receiver B2 receives an infrared signal, the controller 110 determines that the robotic mower 100 has reached the boundary of the working area.

The virtual boundary apparatus may be a global positioning module (not shown) disposed inside the robotic mower 100, a lawn identification module (also not shown), or a photographing module (also not shown) disposed outside the working area.

The global positioning module performs wireless communication with a satellite to learn a current position coordinate of the robotic mower 100. The controller 110 uses a predetermined position coordinate sequence to form virtual boundary information and form a map of the working area. If the position coordinates detected by the global positioning module are not inside the map surrounded by the virtual boundary information, the controller 110 determines that the robotic mower 100 is located outside the working area.

The lawn identification module is configured to determine whether a current position of the robotic mower 100 is a lawn according to a color or dampness of the ground. The controller 110 determines, according to whether the robotic mower 100 is located on a lawn, whether the robotic mower 100 is located inside the working area.

Specifically, the lawn identification module may be a color sensor (not shown) that faces toward the ground, or several electrodes (also not shown) that are disposed at the bottom of the housing of the robotic mower 100. The color sensor detects a color of the ground. If the color is green, the controller 110 determines that the robotic mower 100 is located inside the working area. The several electrodes protrude outward from the bottom of the housing. A distance between the several electrodes and the ground is less than a cutting height of the cutting blade. When the robotic mower 100 is located on a lawn, grass that has or has not been cut exists between the several electrodes. A dielectric constant $\varepsilon$ of the grass is far greater than a dielectric constant c of the air, and capacitance C between the several electrodes satisfies: $C=\varepsilon S/4\ \pi kd$; where S is a facing size of the several electrodes, k is a constant, and d is a distance of the several electrodes. When the several electrodes are set, the facing size S and the distance d of the electrodes are both constants, that is, change of the capacitance C is only related to the dielectric constant $\varepsilon$. Whether the robotic mower 100 is located on a lawn can be learned by detecting capacitance between the several electrodes.

The photographing module shoots the image of the robotic mower 100 and to-be-set working area, and defines a closed virtual boundary on the shot image. If it is shown on the shot image that the robotic mower 100 is located outside the virtual boundary, the controller 110 determines that the robotic mower 100 is located outside the working area.

The robotic mower 100 further includes an obstacle detection module that is configured to detect an obstacle. When the obstacle detection module detects an obstacle, the controller 110 controls the robotic mower 100 to change its moving direction to avoid the obstacle.

Further referring to FIG. 6, in this embodiment, the obstacle detection module is a collision sensor 15, such as a Hall sensor. The housing includes an outer housing 12 and an inner housing 14. The outer housing 12 covers the inner housing 14. The collision sensor 15 is disposed between the inner housing 14 and the outer housing 12. When the robotic mower 100 collides with an obstacle, the collision sensor 15 can detect relative movement between the inner housing 14 and the outer housing 12. In another embodiment, the obstacle detection module may also be an ultrasonic generator and an ultrasonic receiver. An ultrasonic signal generated by the ultrasonic generator is reflected by an obstacle and then is received by the ultrasonic receiver. A distance between the robotic mower 100 and the obstacle can be calculated according to a time difference between generating and receiving the ultrasonic signal.

The robotic mower 100 further includes a rainwater detection module that is configured to detect rainwater. When the rainwater detection module detects rainwater, the controller 110 controls the robotic mower to return to the station. The rainwater detection module is a conduction detection module that has one positive plate and one negative plate. The positive plate and the negative plate are disposed in a groove 16 at the top of a housing 12 of the robotic mower 100. When there is water or other conductive liquid in the groove 16, the positive plate and the negative plate are conductive, and the rainwater detection module can detect rainwater.

When the robotic mower 100 needs to return to the station 200 to be charged or for sheltering or stopping, the controller controls the robotic mower to return to the station along a boundary of the working area.

When the boundary apparatus is a wire, the controller 110 controls the robotic mower to cross the wire to return to the station in a clockwise or counterclockwise direction.

Referring again to FIGS. 3 and 4, at least one ultrasonic generator is disposed at the station 200, and the robotic mower 100 is provided with at least one ultrasonic receiver. When the robotic mower 100 goes back, the controller 110 adjusts a moving direction of the robotic mower 100 according to a receiving condition of the ultrasonic receiver, so that the robotic mower 100 returns directly toward the station 200.

Further, specifically, a first ultrasonic generator A, a second ultrasonic generator B and an infrared generator C are disposed at the station 200. The two ultrasonic generators A and B are separately located at two sides of the infrared generator C. The first ultrasonic generator A is configured to generate a first ultrasonic signal, the second ultrasonic generator B is configured to generate a second ultrasonic signal of which a frequency or intensity is different from that of the first ultrasonic signal, and the infrared generator C is configured to generate an infrared signal that is linear.

Correspondingly, the robotic mower 100 is provided with a first ultrasonic receiver R1, a second ultrasonic receiver R2 and an infrared receiver R3. When the robotic mower 100 goes back, the first ultrasonic generator A and the second ultrasonic generator B are configured to guide the robotic mower 100 to move toward the station 200. When the robotic mower 100 is close to the station 200 and receives the infrared signal, the infrared generator C guides the robotic mower 100 to connect to the station 200 to be charged.

Referring again to FIG. 9, when the boundary apparatus is several wireless generators A1, A2, A3 and A4, especially infrared generators, the several wireless generators A1, A2, A3 and A4 are disposed at several corners of the working area and have a consistent clockwise or counterclockwise emission direction. Side surfaces of the robotic mower 100 are provided with wireless receivers B1 and B2, and a front end of the robotic mower 100 is provided with a wireless receiver B3. The controller 110 controls the robotic mower 100 to enable the wireless receiver B3 at the front end to keep receiving a wireless signal, so as to enable the robotic mower 100 to return to the station 200. If the robotic mower 100 reaches the boundary and the wireless receiver B1 receives the wireless signal, the controller 110 controls the robotic mower 100 to revolve until the wireless receiver B3 at the front end receives the wireless signal and the moving direction of the robotic mower 100 is maintained. When the robotic mower 100 reaches a corner and the wireless receiver B1 receives the wireless signal again, the controller 110 controls the robotic mower 100 to revolve until the wireless receiver B3 at the front end receives the wireless signal again, so that the robotic mower 100 returns to the station 200 along the boundary in a clockwise or counterclockwise direction. In another embodiment, only one side surface of the robotic mower 100 is provided with a wireless receiver. If an emission direction of the wireless generator is a consistent clockwise direction, the wireless receiver is disposed at a left side of the robotic mower 100. If the emission direction of the wireless generator is a consistent counterclockwise direction, the wireless receiver is disposed at a right side of the robotic mower 100.

It may be conceived by a person skilled in the art that a specific structure of a robotic mower in the present disclosure may have many variable forms, and technical solutions that have the same or similar main technical features with the present disclosure should all fall within the protection scope of the present disclosure.

What is claimed is:

1. A robotic mowing system comprising a station and a robotic mower, wherein the robotic mower has a controller, a memorizer, a power source and a drive motor, the memorizer configured to store a fixed working procedure and the controller configured to execute the fixed working procedure after receiving a start command input by a user so as to control the robotic mower to automatically and repeatedly mow and return to the station to be charged until the controller receives a stop command input by the user without a working parameter input by the user to define completion of mowing.

2. A robotic mowing system comprising a station and a robotic mower, wherein the robotic mower has a controller, a memorizer, a power source and a drive motor, the memorizer configured to store a fixed working procedure and the controller configured to execute the fixed working procedure after receiving a start command input by a user so as to control the robotic mower to automatically and repeatedly mow and return to the station to be charged until the controller receives a stop command, wherein the fixed working procedure comprises:
   starting the drive motor;
   controlling the robotic mower to enter into a predetermined working area;
   controlling the robotic mower to mow according to a predetermined route or a random route;
   detecting power or a discharge time of the power source, and if the power of the power source is lower than a first predetermined value or the discharge time reaches a first predetermined time, controlling the robotic mower to return to the station to be charged; and
   detecting the power or a charging time of the power source, and if the power of the power source reaches a second predetermined value or the charging time reaches a second predetermined time, controlling the robotic mower to mow again.

3. The robotic mowing system according to claim 2, wherein the robotic mowing system further comprises a physical boundary apparatus configured to form a boundary line to define the predetermined working area, and the robotic mower working within the predetermined working area.

4. The robotic mowing system according to claim 3, wherein the physical boundary apparatus comprises independent wireless generators configured to generate a wireless signal as a boundary signal, and wherein the robotic mower comprises a wireless receiver that detects the boundary signal.

5. The robotic mowing system according to claim 4, wherein the wireless generator comprises an infrared generator and the wireless receiver comprises an infrared receiver.

6. The robotic mowing system according to claim 2, wherein the robotic mowing system further comprises a virtual boundary apparatus configured to define the predetermined working area of the robotic mower.

7. The robotic mowing system according to claim 6, wherein the virtual boundary apparatus comprises a global positioning module, a photographing module or a lawn identification module, the global positioning module configured to perform wireless communication with a positioning satellite and form a virtual boundary by using a predetermined position coordinate sequence, the photographing module configured to shoot the robotic mower and its surrounding area and delineate a virtual boundary on a shot image, and the lawn identification module configured to determine whether the ground is a lawn according to a color or dampness of a lawn.

8. The robotic mowing system according to claim 2, wherein the controller controls the robotic mower to return to the station along a boundary of the predetermined working area.

9. The robotic mowing system according to claim 2, wherein the controller controls the robotic mower to return directly toward the station.

10. The robotic mowing system according to claim 9, wherein the station comprises at least one ultrasonic generator, the robotic mower comprises at least one ultrasonic receiver, the controller adjusts a moving direction of the robotic mower according to a receiving condition of the ultrasonic receiver when the robotic mower goes back, so that the robotic mower returns toward the station.

11. The robotic mowing system according to claim 10, wherein the station comprises an ultrasonic generator and an infrared generator, the robotic mower comprises an ultrasonic receiver and an infrared receiver, the ultrasonic generator and the ultrasonic receiver are configured to guide the robotic mower to return toward the station, and the infrared generator and the infrared receiver are configured to guide the robotic mower to connect to the station to be charged.

12. A robotic mowing system comprising a station and a robotic mower, wherein the robotic mower has a controller, a memorizer, a power source and a drive motor, the memorizer configured to store a fixed working procedure and the controller configured to execute the fixed working procedure after receiving a start command input by a user so as to control the robotic mower to automatically and repeatedly mow and return to the station to be charged until the controller receives a stop command, wherein the robotic mower further comprises an operation interface operable for a user, the operation interface comprises only a power button, a start button and a stop button, the power button is used for turning on/off power of the robotic mower, the start command is generated when the start button is pressed down, and the stop command is generated when the stop button is pressed down.

13. The robotic mowing system of claim 12, wherein the start button and the stop button are combined into a single button.

14. The robotic mowing system of claim 12, wherein the start button and the stop button are implemented in separate buttons.

15. The robotic mowing system of claim 12, wherein the station includes a return signal generator that is configured to generate a return signal, the return signal configured to instruct the robotic mower to return to the station.

16. The robotic mowing system of claim 15, wherein the return signal generator includes a first ultrasonic generator, a second ultrasonic generator, and an infrared generator.

17. The robotic mowing system of claim 16, wherein the robotic mower is configured to adjust a moving direction of the robotic mower responsive to conditions of ultrasonic signals received from the first ultrasonic generator and the second ultrasonic generator.

18. The robotic mowing system of claim 16, wherein the first ultrasonic generator is located at two sides of the infrared generator.

19. The robotic mowing system of claim 16, wherein the robotic mower is configured to connect to the station to be charged responsive to the infrared signal.

20. The robotic mowing system of claim 12, wherein the station is configured to provide a shelter to shelter the robotic mower from rain.

* * * * *